United States Patent

Tsukamoto

(12) United States Patent
(10) Patent No.: US 6,699,540 B1
(45) Date of Patent: Mar. 2, 2004

(54) MATERIALS OF PACKING AND PACKING MADE FROM THE MATERIALS

(75) Inventor: Katsuro Tsukamoto, Osaka (JP)

(73) Assignee: Japan Matex Kabushiki Kaisha (JP)

( * ) Notice: Subject to any disclaimer, the term of this patent is extended or adjusted under 35 U.S.C. 154(b) by 375 days.

(21) Appl. No.: 09/621,367

(22) Filed: Jul. 21, 2000

(30) Foreign Application Priority Data

Jul. 23, 1999 (JP) .......................................... 11-209913

(51) Int. Cl.[7] .............................. C25D 7/04; B32B 7/00; B21F 27/00; B21F 27/08; F16J 15/08
(52) U.S. Cl. ...................... 428/34.1; 428/607; 428/608; 428/36; 245/1; 245/2; 245/3; 245/4; 245/5; 245/6; 245/7; 245/8; 245/9; 245/10; 277/650; 277/653; 502/527.2
(58) Field of Search .................. 428/607, 608, 428/34.1, 36; 245/2, 1, 3–10; 277/650, 653; 502/527.2

(56) References Cited

U.S. PATENT DOCUMENTS

| | | | | |
|---|---|---|---|---|
| 2,709,132 A | * | 5/1955 | Giles | 420/12 |
| 3,690,606 A | * | 9/1972 | Pall et al. | 428/605 |
| 4,180,211 A | * | 12/1979 | Olcott et al. | 239/265.43 |
| 4,559,248 A | * | 12/1985 | Sumiyoshi et al. | 442/5 |
| 5,225,007 A | * | 7/1993 | Hattori et al. | 148/541 |
| 5,795,540 A | * | 8/1998 | Dwars et al. | 420/12 |

* cited by examiner

*Primary Examiner*—Harold Pyon
*Assistant Examiner*—Catherine A. Simone
(74) *Attorney, Agent, or Firm*—Cislo & Thomas LLP

(57) ABSTRACT

A packing material wherein one or a plurality of hard metal wire and one or a plurality of soft metal wire are tied up or twisted in a bundle to construct a weft material wherein the ratio of the number of the former to the number of the later is 1:1–0.3, the weft material is put in weft knit processing such as plain stitch, rib stitch, pearl stitch, welt stitch, half cardigan, full cardigan, plating stitch and inter-lock stitch, and Brinell hardness of said hard metal wire is 90–240 (Kg/mm$^2$) and Brinell hardness of said soft metal is 40–55 (Kg/mm$^2$).

44 Claims, 10 Drawing Sheets

MATERIALS OF PACKING AND PACKING MADE FROM THE MATERIALS

BACKGROUND OF THE INVENTION

1. Field of the Invention

The present invention relates to materials of packing and the packing made from the materials, and more particularly, it relates to the materials used in a packing which can maintain a good sealing ability for a long time, even when it is used under a high temperature.

2. Description of the Related Art

The exhaust system of a car comprises an exhaust pipe, a catalytic converter, a silencer and such. Further, since the condition of regulation of exhaust gas is getting severe in these days, catalytic converters are starting to be equipped with exhaust systems of motorcycle with four cycle engines.

Within such exhaust systems of automobiles, there is packing (a gasket) installed at a connecting portion of an exhaust pipe and a catalytic converter, i.e., in between a flange set on an end portion of the exhaust pipe and a flange set on an end portion of the catalytic converter, for preventing exhaust to leak out. As for such packing, for example, there is packing which is constructed by cylindrically pressure forming powder or sheet body of expansive graphite.

With the above mentioned existing packing, however, was not preferable for setting on the connecting portion of an exhaust pipe and a catalytic converter. Normally, exhaust of about 400 to 850° C. circulates at the connecting portion of an exhaust pipe and a catalytic converter. The expansive graphite when used under a relatively low temperature is outstanding conformability to the attaching material, self lubricating ability and chemical resistace. However, the expansive graphite also has a defect that it can easily be oxygenated and sublimated in an atmosphere of high temperature of about 400 to 850° C. Therefore, packing made only from expansive graphite was problematic that it lowered its sealing ability if it was used in a condition wherein it was exposed to a fluid of high temperature, because applied relaxation occurred within relatively a short period of time.

Further, due to exhaust system which was continuously vibrating by pulse of exhaust and such, packing made only from expansive graphite had a problem that its sealing ability got lowered within relatively a short period of time. Since a portion around the surface of packing made from expansive graphite had a structure wherein graphite was laminated in a direction of the thickness of packing, the surface layer of packing was easily peeled off when vibration was transmitted to packing. When peeling of the surface layer started, space was formed between a flange set on the end portion of a exhaust pipe and packing or between a flange set on the end portion of a catalytic converter and packing, and exhaust of high temperature came into the space, thus, peeling was quickly promoted even more. In such case, the fluid of high temperature leaked out through the space formed between the flange and packing, therefore, sealing ability could not be maintained.

Moreover, the function of packing used in an exhaust system is to reduce the vibration in each portions of exhaust system which vibrates by the pulse of exhaust. With the above mentioned packing, the vibration could be reduced by the elasticity thereof at the beginning stage of usage. However, as mentioned previously, the packing might be oxygenated or sublimated, or due to peeling occurred on the surface of the packing and space created between the packing and attaching material thereto, the elasticity of the packing could not work efficiently and thus, the vibration in exhaust system could not be lowered. In this case, big vibrating noise is arose from the portions of exhaust system, transmitting the vibration to the driver's seat and causing an unpleasant drive.

As for portions which are exposed to fluid of high temperature of over 400° C., other than the above mentioned exhaust system of automobiles, there are, for example, shaft seal portion of fluid machine of each type which works with fluid of high temperature. At this shaft seal portion, the above mentioned packing made only from expansive graphite was mainly used hitherto. Thus, there was a problem that it was necessary to replace the packing frequently due to lowering of sealing ability of the packing within a short period of time.

BRIEF SUMMARY OF THE INVENTION

The present invention has invented under such actual circumstances, and aims to offer the materials used in a packing which can maintain a good sealing ability for a long time, even when it is used under a high temperature. Additionally, more concretely speaking, the packing mentioned here, for example, indicates seal rings, ring joints, seal washers, spacer rings, seal for absorbing vibration and such which are used under a high temperature.

The present invention as set forth in claim 1 is a packing material wherein one or a plurality of hard metal wire and one or a plurality of soft metal wire are tied up or twisted in a bundle to construct a weft material wherein the ratio of the number of the former to the number of the later is 1:1–0.3, the weft material is put in weft knit processing such as plain stitch, rib stitch, pearl stitch, welt stitch, half cardigan, full cardigan, plating stitch and inter-lock stitch, and Brinell hardness of said hard metal wire is 90–240 (Kg/mm$^2$) and Brinell hardness of said soft metal is 40–55 (Kg/mm$^2$), wherein said hard metal wire is constructed from stainless carbide cast iron comprising iron (Fe) as a main component and each of the following as necessary components by weight %; C: 0.6–4.0%, V: 4–15%, Cr: 13–30%, Ni: 4–15%, Si: 0.2–4.5%, Mn: 0.2–1.5%, P: 0.01–0.15%, S: 0.01–0.05% and within such organization, mainly covalent bonded spheroidal or granular carbide of V-C system is crystallized, and the soft metal wire is constructed from either one of copper, copper alloy, aluminum or aluminum alloy.

The present invention as set forth in claim 2 is a packing material wherein one or a plurality of hard metal wire and one or a plurality of soft metal wire are tied up or twisted in a bundle to construct a warp material wherein the ratio of the number of the former to the number of the later is 1:1–0.3, warp material is put in warp knit processing such as single tricot stitch, single atlas stitch, plain code stitch, double tricot stitch, lace stitch, Milanese stitch and raschel stitch, Brinell hardness of said hard metal wire is 90–240 (Kg/mm$^2$), and Brinell hardness of said soft metal is 40–55 (Kg/mm$^2$), wherein said hard metal wire is constructed from stainless carbide cast iron comprising iron (Fe) as a main component and each of the following as necessary components by weight %; C: 0.6–4.0%, V: 4–15%, Cr: 13–30%, Ni: 4–15%, Si: 0.2–4.5%, Mn: 0.2–1.5%, P: 0.01–0.15%, S: 0.01–0.05% and within such organization, mainly covalent bonded spheroidal or granular carbide of V-C system is crystallized, and the soft metal wire is constructed from either one of copper, copper alloy, aluminum or aluminum alloy.

The present invention as set forth in claim 3 is a packing material wherein one or a plurality of hard metal wire and one or a plurality of soft metal wire are tied up or twisted in a bundle to construct a weft material and a warp material wherein the ratio of the number of the former to the number of the later is 1:1–0.3, a plurality of each of the warp material and the warp material are prepared and put in knit processing such as single weave combination weave, gauze & leno weave, figured weave, and Brinell hardness of said hard metal wire is 90–240 (Kg/mm$^2$) and Brinell hardness of said soft metal is 40–55 (Kg/mm$^2$), wherein said hard metal wire is constructed from stainless carbide cast iron comprising iron (Fe) as a main component and each of the following as necessary components by weight %; C: 0.6–4.0%, V: 4–15%, Cr: 13–30%, Ni: 4–15%, Si: 0.2–4.5%, Mn: 0.2–1.5%, P: 0.01–0.15%, S: 0.01–0.05% and within such organization, mainly covalent bonded spheroidal or granular carbide of V-C system is crystallized, and the soft metal wire is constructed from either one of copper, copper alloy, aluminum or aluminum alloy.

The present invention as set forth in claim 4 is a packing material wherein after one or a plurality of hard metal wire and one or a plurality of soft metal wire are curled or formed into a coil-shape, these hard metal wire and soft metal wire are twisted each other with the ratio of the number of the former to the number of the later being 1:1–0.3, Brinell hardness of said hard metal wire is 90–240 (Kg/mm$^2$), and Brinell hardness of said soft metal is 40–55 (Kg/mm$^2$), wherein said hard metal wire is constructed from stainless carbide cast iron comprising iron (Fe) as a main component and each of the following as necessary components by weight %; C: 0.6–4.0%, V: 4–15%, Cr: 13–30%, Ni: 4–15%, Si: 0.2–4.5%, Mn: 0.2–1.5%, P: 0.01–0.15%, S: 0.01–0.05% and within such organization, mainly covalent bonded spheroidal or granular carbide of V-C system is crystallized, and the soft metal wire is constructed from either one of copper, copper alloy, aluminum or aluminum alloy.

The present invention as set forth in claims 5 to 7 is a packing material set forth in either one of the claims 1 to 3, wherein a metallic powder layer comprising at least one kind selected from copper powder, copper alloy powder, carbon steel powder, nickel powder and nickel alloy powder is uniformly set on one surface side thereof and an expansive graphite layer is uniformly set on the other surface side thereof.

The present invention as set forth in claim 8 is a packing material wherein the packing material set forth in the claim 4 is formed into a sheet-shape of which one surface side is uniformly set with at least one kind selected from copper, copper alloy, carbon steel, nickel and nickel alloy, and of which other surface side is uniformly set with an expansive graphite layer.

The present invention as set forth in claims 9 to 11 is a packing material in a cylindrical body comprised of the packing material set forth in either one of the claims 1 to 3, wherein a blinding material which is either strip-shape, flocculent shape or nonwoven fabric-like shape and is comprised of at least one kind selected from copper, copper alloy, carbon steel, nickel and nickel alloy, is inserted.

The present invention as set forth in claim 12 is a packing material wherein the packing material set forth in the claim 4 is formed into a cylindrical shape wherein a blinding material which is either strip-shape, flocculent shape or nonwoven fabric-like shape and is comprised of at least one kind selected from copper, copper alloy, carbon steel, nickel and nickel alloy, is inserted.

The present invention as set forth in claims 13 to 16 is a packing material wherein the packing material set forth in either one of the claims 1 to 4 is applied with a nitriding.

The present invention set forth in claims 17 to 20 is a packing material wherein the surfaces of said hard metal wire and said soft metal wire of the packing material set forth in either one of the claims 1 to 4 are applied with either copper or nickel plating.

The present invention set forth in claims 21 to 23 is a packing material wherein the packing material set forth in the claim 4 is formed into a strip-shape wherein a rolled body which is cylindrically rolled with this strip-shaped packing material is pressure formed in a shaft direction.

The present invention as set forth in claim 24 is a packing material wherein the packing material set forth in the claim 4 is formed into a cylindrical shape and then this cylindrical shaped packing material is pressure formed in a shaft direction thereof.

The present invention as set forth in claims 25 to 28 is a packing wherein the packing material set forth in either one of the claims 1 to 4 is pressure formed into a platen shape and then is cut into a desired shape having a centre bore.

The present invention as set forth in claims 29 to 32 is a packing wherein the packing material set forth in either one of the claims 9 to 12 is flattened in a radial direction and a rolled body which is cylindrically rolled with said packing material is pressure formed in a shaft direction thereof.

The present invention set forth in claims 33 to 44 is a packing wherein the surfaces of the packing set forth in either one of the claims 21 to 32 are applied with either copper or nickel plating.

DESCRIPTION OF PREFERRED EMBODIMENTS OF THE INVENTION

A packing and materials used for the packing set forth in the first embodiment of the present invention will be explained with a reference made to the drawings.

Figure 1:
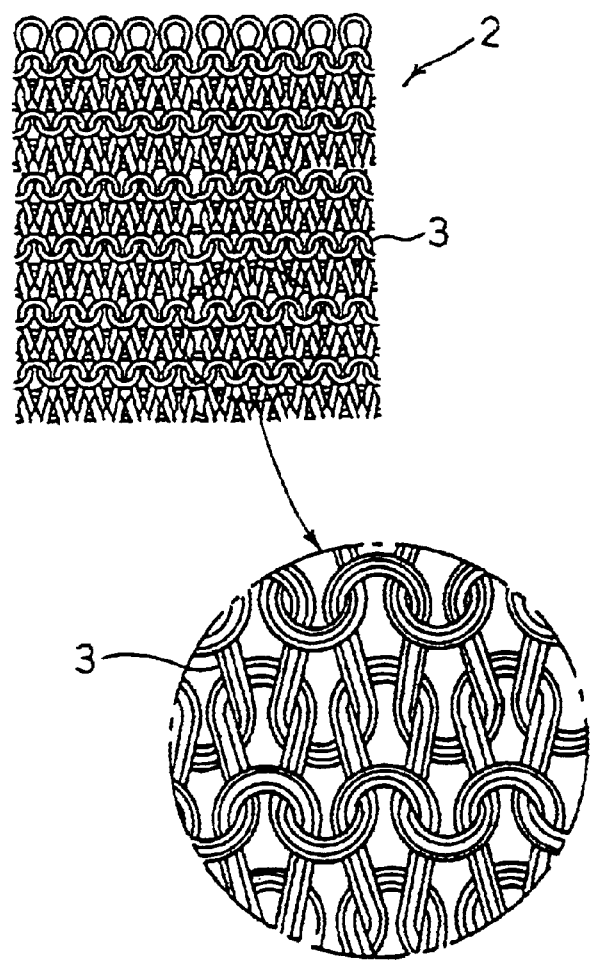
FIG. 1 is a plan view showing a part of a packing material set forth in the first embodiment of the present invention.
Figure 2:
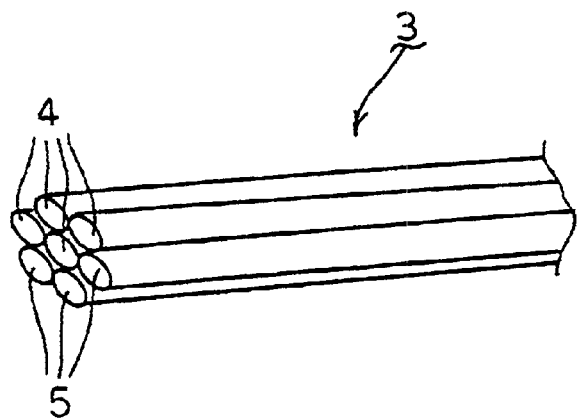
FIG. 2 is a perspective view showing a weft material of the first embodiment of the present invention.
Figure 3:
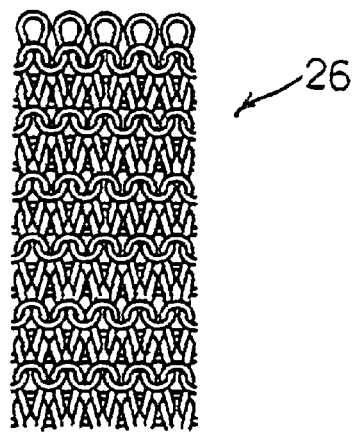
FIG. 3 is a perspective view showing a part of a strip-shaped packing material of the first embodiment of the present invention.
Figure 4:
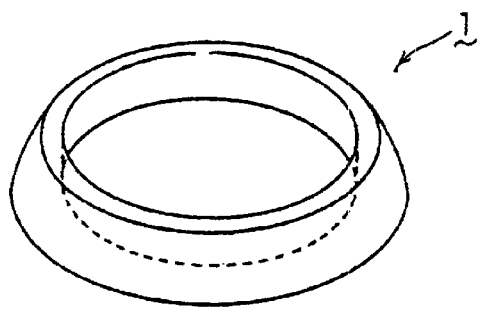
FIG. 4 is a perspective view showing a packing set forth in the first embodiment of the present invention.

FIG. 1 is a plan view showing a part of a packing material set forth in the first embodiment. FIG. 2 is a perspective view showing a weft material constructing the packing material shown in FIG. 1. FIG. 3 is a plan view showing a part of a strip-shaped packing material. FIG. 4 is a perspective view showing a packing set forth in the first embodiment.

As for packing (1) set forth in the first embodiment, packing material (2) is made into a strip-shape, and a rolled body wherein this strip-shaped packing material (26) is rolled in a cylindrical shape is pressure formed in a shaft direction of said rolled body.

The packing material (2) is constructed by carrying out a weft knit processing of weft material (3).

As for the weft material (3), one or a plurality of hard metal wire (4) and one or a plurality of soft metal wire (5) are tied up or twisted in a bundle wherein the ratio of the number of the former to the number of the later is 1:1–0.3. Additionally, in the illustrated example, four pieces of the hard metal wire (4) and three pieces of soft metal wire (5) are tied up in one piece of weft material wherein the ratio of the number of the hard metal wire (4) to the number of the soft metal wire (5) is 3:4, i.e., 1:0.75.

The hard metal wire (4) is to enhance mechanical strength of the packing (1) Brinell hardness of the hard metal wire (4) is 90–240 (Kg/mm$^2$), preferably, 190–240 (Kg/mm$^2$) Metal materials having such strength has high mechanical strength such as tensile strength, under a high temperature, and further, endurance limit against repeated load is also high. Therefore, the hard metal wire (4) raises mechanical strength of packing materials (2) under a high temperature, thus, it can raise mechanical strength of the packing (1). Additionally, creep hardly occurs to the metals with such hardness under a high temperature. Therefore, creep resistance is enhanced by using such metal, and thus, it is possible not to cause stress relaxation to the packing (1).

As for such metals, carbon steel such as stainless steel and inconel, nickel and nickel alloy can be given as examples thereof.

Also, other than these metals, the following can be used. That is, stainless carbide cast iron comprising iron (Fe) as a main component and each of the following as necessary components by weight %; C: 0.6–4.0%, V: 4–15%, Cr: 13–30%, Ni: 4–15%, Si: 0.2–4.5%, Mn: 0.2–1.5%, P: 0.01–0.15%, S: 0.01–0.05%; and within such organization, mainly covalent bonded spheroidal or granular carbide of V—C system is crystallized, and the soft metal wire is constructed from either one of copper, copper alloy, aluminium or aluminium alloy.

Next section explains this stainless carbide cast iron.

The purpose of mixing C and V is to improve abrasion-resistance while spheroidal or granular carbide of V—C system is crystallized.

The content of Carbon (C) should be 0.6–4.0%. When less than 0.6% of C composed, hardness and mechanical property of the alloy cast iron do not change much. However, when more than 0.6% of C composed, hardness and mechanical property of the alloy cast iron improve, but composing of more than 4% of C makes C change to platen carbide of Fe—Cr system (i.e. cementite) and lowers its corrosion-resistance.

The content of Vanadium (V) should be 4.0–15%. When less than 4.0% of V composed, spheroidal or granular carbide of V—C system cannot be crystallized because of dispersion of the carbide which is very hard, and no better effect can be expected with composing of more than 15% of V that would easily segregate. Neither of the above cases is desirable. Rather, it is more desirable that the content of V to be about 4 times as much as the content of C, since the ratio of atomic number is about 1:1 (weight ratio 4:1) with carbide as VC in spheroidal or granular carbide of V—C system.

Chromium (Cr) and Nickel (Ni) are mixed for an improvement of corrosion-resistance.

The content of Cr should be 13–30%. When less than 13% of Cr composed, stable austenite (γ) cannot be crystallized with decreasing corrosion-resistance against oxidizing solution. On the other hand, with composing of more than 30% of Cr, platen carbide is crystallized with segregation causing a deterioration of strength. Neither of the above cases is desirable.

The content of Ni should be 4.0–15%. With less than 4.0% of Ni composing, it makes metal organization to be martensite, but on the other hand, with composition of more than 15% of Ni, a base becomes soft with segregation causing a deterioration of strength. Neither of the above cases is desirable, but composing of more than 4.0% of Ni improves corrosion-resistance against non-oxidizing solution.

Silicon (Si) is effective for deoxidization and for increasing hardness, with betterment of castability. Its content should be 0.2–4.5%. With less than 0.2% of Si composed, Si cannot be as effective as said previously, but on the other hand, with composing of more than 4.5% of Si, toughness decreases, thus neither of the above cases is desirable.

When mixing Manganese (Mn), its content should be 0.2–1.5%. Composing of more than 1.5% of Mn is not desirable for the alloy cast iron of V—C system as it easily segregates.

Phosphorus (P) is effective for improving hardness a little, and for a betterment of castability with improving liquidity, and its content should be 0.01–0.15%. Composing of both less than 0.01% of P wherein P cannot be as effective as said previously and more than 0.15% of P with possible segregation and brittleness are not desirable.

When mixing Sulfur (S), its content should be 0.01–0.05%. Generally, composing of more than 0.05% of S is not desirable as corrosion-resistance decreases with $Fe_3C$ (cementite) and MnS (Manganese Sulfide) are easily crystallized.

The above mentioned elements are the necessary components that are included with iron (Fe) which is a main component. In the present invention, at least more than one kind selected from additives (a)–(d) as follows: (a) Mo; (b)

Ti; (c) B; and (d) at least more than 2 kinds of alloy elements selected from Cu, W, Zr, Co, Nb, Ta and Y, can be mixed within said necessary components as one pleases.

Molybdenum (Mo) is effective in preventing deposition of graphite and in stabilizing the base. When mixing Mo, its content should be 0.05–15%. Composing of both less than 0.05% of Mo wherein Mo cannot be as effective as said previously and more than 15% of Mo wherein spheroidal or granular carbide of V—C system cannot be crystallized stably because of dispersion of the carbide which is very hard with deterioration of corrosion-resistance are not desirable.

Titanium (Ti) is effective in denitrification and in refining the organization of alloy cast iron. When mixing Ti, its content should be 0.01–5.0%. Composing of both less than 0.01% of Ti wherein Ti cannot refine effectively and more than 5.0% of Ti wherein making carbide of V—C system to be spheroidal in shape is deteriorated with increased deposition of Ti are not desirable.

Boron (B) is effective for increasing hardness in a heat treatment. When including B, its content should be 0.01–2.0%. Composing of both less than 0.01% of B wherein B cannot be as effective as said previously and more than 2.0% of B causing a deterioration of strength are not desirable.

Copper (Cu), Tungsten (W), Zirconium (Zr), Cobalt (Co), Niobium (Nb), Tantalum (Ta) and Yttrium (Y) can be included to meet purposes such as for the improvement of corrosion-resistance, abrasion-resistance and heat-resistance as one wishes. More than two kinds of these elements would be better included so that much more outstanding effects can be obtained even though the composing of one kind of these elements is effective. However, a random composition of these elements would not always make a covalent bond strong, so when an improvement of corrosion-resistance is desired, a total content of more than two kinds of elements should be 0.2–5%.

As for this stainless spheroidal carbide cast iron, said composition components explained above can be included in addition to the necessary components, C, V, Cr, Ni, Si, Mn, P and S, to meet purposes as one wishes. Particularly, it is effective to include Si, P, B, Zr, Cu, Nb, Ta and Y for a stabilization of hardness of high carbon inclusive substance; Cr, Mo and W are for a stabilization of base and for a prevention of deposition of kish graphite; Ti is for refining the metal organization in a process of casting and for a degasification; and Ni and Co for a prevention of becoming a martensite of the metal organization.

Since this stainless spheroidal carbide cast iron comprises C, V, Cr, Ni, Si, Mn, P and S as necessary components, the carbide crystallized within the organization is made to be in spheroidal shape in order to show outstanding abrasion-resistance. Also, it can display the corrosion-resistance which is equal to those of stainless steel because of the carbide made to be in spheroidal shape.

In other words, this stainless spheroidal carbide cast iron is outstanding not only in toughness and strength but also in abrasion-resistance and corrosion-resistance. Therefore, since all of toughness, strength, abrasion-resistance and corrosion-resistance can be manifested in high levels, it can suitably be used as a packing material used under sever conditions. Additionally, it is preferable to have a diameter of the hard metal wire (4) being 0.05–0.35 mm. If the diameter is less than 0.05 mm, the hard metal wire (4) may fracture during a weft knit processing of the weft material (3). On the contrary, if the diameter is over 0.35 mm, it is difficult to weft knit process the weft material (3).

The soft metal wire (5) is to improve not only processability of the weft material (3) but also conformability of weft material (3). The Brinell hardness of metal materials for constructing the soft metal wire (5) is to be 40–55 (Kg/mm$^2$). The hardness of metal materials having such Brinell hardness is lower than that of the contacting opponent material. Thus, when the opponent material is relatively displaced, the packing (1) will not damage the opponent material. Also, this metal material has outstanding flexibility and is easily carried out in a plastic working. Therefore, more portion soft metal wire (5) takes, easier the weft material (3) is weft knit processed. Further, when making the weft knit processed weft material into a packing (1) by a pressure forming, it can be a packing (1) which surface and inside are minutely closed. Also with the metal material with such hardness, it has good conformability against the opponent material. Therefore, more portion soft metal wire (5) takes, the conformability of the weft material (3) improved more, and thus, the sealing ability of the packing (1) can be improved. Furthermore, the quality of metal material with such hardness is hard to change under a high temperature around 400–850° C. Thus the sealing ability of the packing (1) can be stabilized under a high temperature. As for such metal, for example, there are copper, copper alloy such as monel metal, aluminum, aluminum alloy.

The diameter of the soft metal wire (5) is 0.05–0.35 mm, preferably. If the diameter is below 0.05 mm, there is a fear of tearing the soft metal wire (5) apart. On the other hand, if the diameter is over 0.35 mm, the weft material (3) gets hard to weft knit process.

The weft material (3) is comprised of such hard metal wire (4) and the soft metal wire (5). As previously mentioned, the ratio of the number of the hard metal wire (4) to the number of the soft metal wire (5) is 1:1–0.3. If this is to be shown as the value of ratio, it is 1—about 3.3. If the value of ratio is below 1, the characteristic of the soft metal wire (5) stands out too much to restrain the characteristic of the hard metal wire (4). Thus, the weft material (3) cannot gain sufficient strength. On the other hand, if the value of ratio is over 3.3, the hard metal wire (4) stands out too much to restrain the characteristic of the soft metal wire (5). Thus, the weft material (3) gets hard to weft knit process. Also, when making these metal wires into a packing (1), conformability thereof gets worse and thus, the sealing ability of the packing (1) is lowered.

The hard metal wire (4) and the soft metal wire (5) are aggregated together to construct the weft material (3), and as for an aggregation form thereof, it can take a structure wherein the hard metal wire (4) and the soft metal wire (5) are bound into a bundle or are twisted together to make up a string. If it takes a structure wherein these metal wires are twisted together, the weft material (3) becomes well arranged and thus, the weft material (3) gets easily weft knit processed.

The packing material (2) can be gained by a weft knit process of the weft material (3). The form of weft knit processing is not particularly restricted, and as for examples, there are plain stitch, rib stitch, pearl stitch, welt stitch, half cardigan, full cardigan, plating stitch and inter-lock stitch.

FIG. 1 is an example of the packing material (2) which is constructed by the pearl stitch. This packing material (2) constructed by the pearl stitch has better elasticity than a packing material (2) which is constructed by the plain stitch and surpasses in stability of the stitch structure. Therefore, it can express the outstanding characteristics in a well balanced manner.

A strip-shaped packing material (26) is a packing material (2) which is shaped into a strip. It can be gained by cutting up the packing material (2) into strips or by previously weft knit processing the weft material (3) into a strip-shape.

As for improving the strength of the strip-shaped material (26), it is possible to apply a nitriding to the strip-shaped material (26). In such circumstance, the strip-shaped material (26) gets so hard that when constructing the packing (1), abrasion-resistance, corrosion-resistance and endurance limit thereof can be improved.

Also, as to improve conformability and corrosion-resistance, copper, nickel or metal plating can be applied to a surface of strip-shaped material (26). Also in such circumstance, when constructing the packing (1), conformability and corrosion-resistance thereof can be improved.

The packing (1) is constructed by a pressure forming of a wound body which is a strip-shaped packing material (26) being cylindrically wound, in a shaft direction. The pressure necessary for a pressure forming is not particularly restricted, but is preferably in a range of 300–1200 kgf/cm$^2$. By pressure forming with such pressure, the packing material (2) is sufficiently compressed, and thus, it certainly deforms along inner surfaces of metal mold. At this time, soft metal wire (5) deforms so that it blinds stitches of the packing material (2). Therefore, since the stitches of the packing material (2) gets minute, sealing ability of the packing (1) can be certainly improved.

Further, in an example shown in FIG. 4, an inner periphery surface of the packing (1) is made into a cylindrical shape, and an outer periphery surface thereof is made to be spherical bulged surface-like. Also, end surfaces are made vertical plain surface against an axial line with an outer diameter of one end-surface is bigger than that of the other end-surface. Additionally, the shape of the packing (1) set forth in the first embodiment is not restricted to this certain shape, and it can be a shape of the example shown in FIG. 4 wherein the outer periphery surface is made into cylindrical shape.

Figure 14:
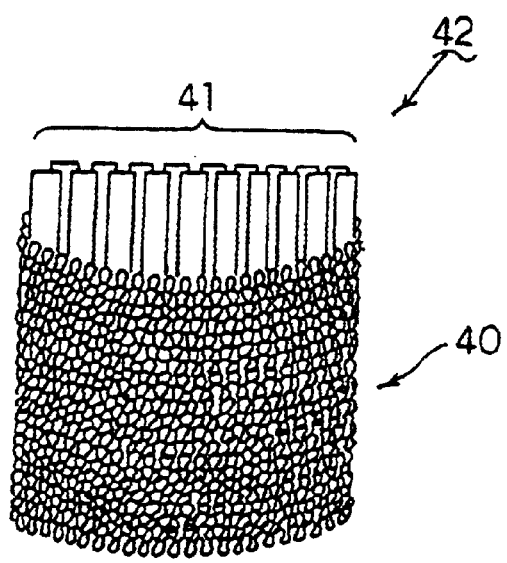
FIG. 14 is a perspective view showing an application example of packing material of the present invention.

Also, as shown in FIG. 14, a packing material (42) may be constructed with a cylindrical body (40) which is made by knitting the packing material (2) into a cylindrical shape, with an inner portion thereof is inserted with blinding material (41) (As for FIG. 14, a strip-shaped blinding material is used as an example.) which is in either strip-shape, flocculent shape or non-woven fabric-like shape, comprising at least either one kind of copper, copper alloy, aluminium, aluminium alloy, carbon steel, nickel or nickel alloy. In this case, a packing (1) with high sealing ability can be obtained by pressure forming the packing material (42) in the shaft direction thereof after cylindrically winding the flatten packing material (42) which is squeezed out in a radial direction, since the blinding material (41) is minutely filled in mesh of the packing material (42).

Additionally, the packing (1) can also be constructed without filling the blinding material (41) in the inside portion of packing material (42) which is squeezed out in a radial direction to be wound cylindrically and then to be pressure formed in the shaft direction.

Figure 5:
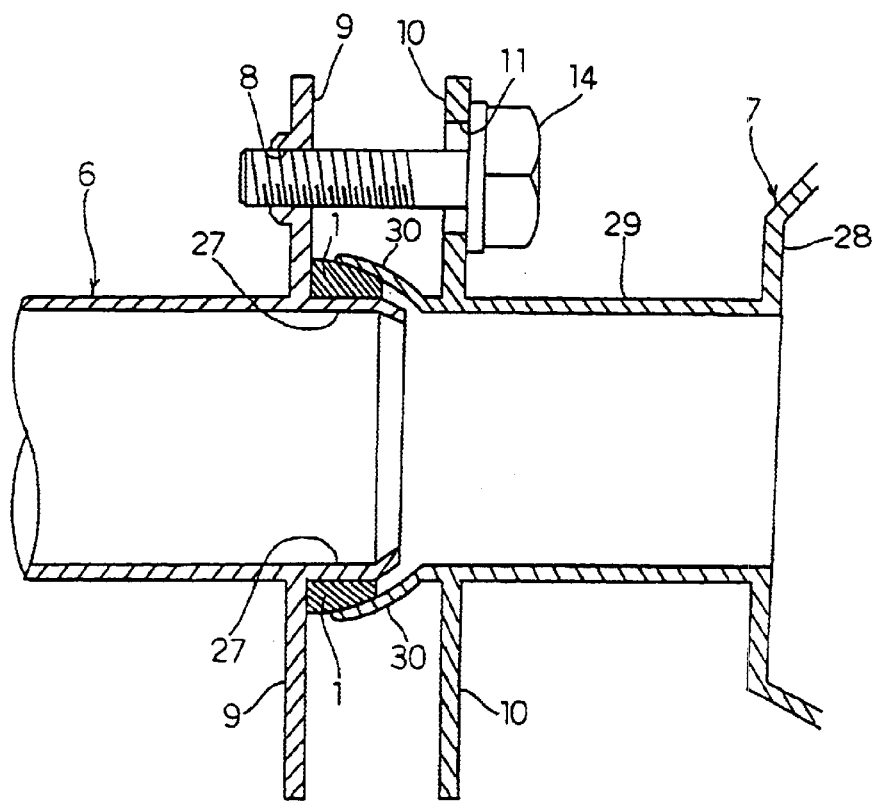
FIG. 5 is a sectional view showing a using condition of the packing shown in FIG. 4.

The packing (1) set forth in the first embodiment, for example, is used in a condition described in the below. FIG. 5 is a sectional view showing a using condition of the packing shown in FIG. 4.

FIG. 5 shows an exhaust system wherein the packing (1) is used. The exhaust system comprises an exhaust pipe (6) extended out from an engine (not shown in the drawings) and a catalytic converter (7) which is connected to an back end portion of the exhaust pipe (6). A flange (9) having a female screw portion is installed around the back end portion of the exhaust pipe (6), and the back end portion of the exhaust pipe (6) is shown as a cylinder portion (27) with the packing (1) fit on the outside thereof. On the other hand, the catalytic converter (7) comprises a main body (28) and a tube body (29) unified at the front side of the main body (28). A flange (10) having a bolt inserting bore (11) installed around a front end portion of the tube body (29). The front end portion of the tube body (29) is shown as a spherically surfaced widen bore (30) which is gradually widened toward the front. The exhaust pipe (6) and the catalytic converter (7) are connected by inserting a leg portion of bolt (14) into the bolt inserting bore (11) and screwing a male screw portion of the bolt (14) to a female screw portion. By screwing a male screw portion of the bolt (14) to the female screw portion, the packing (1) will be in a condition of being tighten up by the cylinder portion (27) and the spherically surfaced widen bore (30).

The packing (1) is to be fit on the cylinder portion (27) set at the exhaust pipe (6). Also, one end surface of the packing (1) is attached to the flange (9) set on the exhaust pipe (6) and an outer peripheral surface thereof is attached to an inner surface of the spherically surfaced widen bore (30) set on the catalytic converter (7). The catalytic converter (7) may slightly move in a shaft direction, however, in such case, the spherically surfaced widen bore (30) slides on the outer peripheral surface of the packing (1).

Within such exhaust system, exhaust from the engine is introduced to the catalytic converter (7) after passing through the exhaust pipe (6). At this time, the packing (1) can prevent the exhaust to leak out through the cylinder portion (27) set at the exhaust pipe (6) and the spherically surfaced widen bore (30) set on the catalytic converter (7). In other words, as mentioned previously, the packing (1) has good conformability against the contacting opponent material and is outstanding in elasticity, and thus, it can certainly prevent the exhaust from leaking out.

Additionally, although said other end surface of the packing (1) is exposed to the exhaust of about 400–850° C., the packing (1) will not cause applied relaxation with such temperature, thus, it can prevent the exhaust from leaking out for a long time of period.

Additionally, due to pulsation of exhaust and such, the exhaust pipe (6) and the catalytic converter (7) vibrate continuously, and due to impact and such received from road surface when running, the catalytic converter (7) may slightly moved in the shaft direction of the exhaust pipe (6), however, even in such bad conditions, the packing (1) is not only able to certainly prevent the exhaust from leaking out but to absorb the vibration. Therefore, the packing (1) has not only good conformability against the contacting opponent material but also high strength against repeated load. Also, with this packing (1), the surface will not come off unlike a packing made of expansive graphite, thus, it can certainly seal even a portion wherein vibration is strong. Furthermore, since the whole of the packing (1) is constructed with metal wire, the elasticity thereof is also high. Therefore, the packing (1) efficiently absorbs the vibration of the exhaust system, not conveying the vibration to a driver's sheet, and can prevent sound generation.

Figure 6:
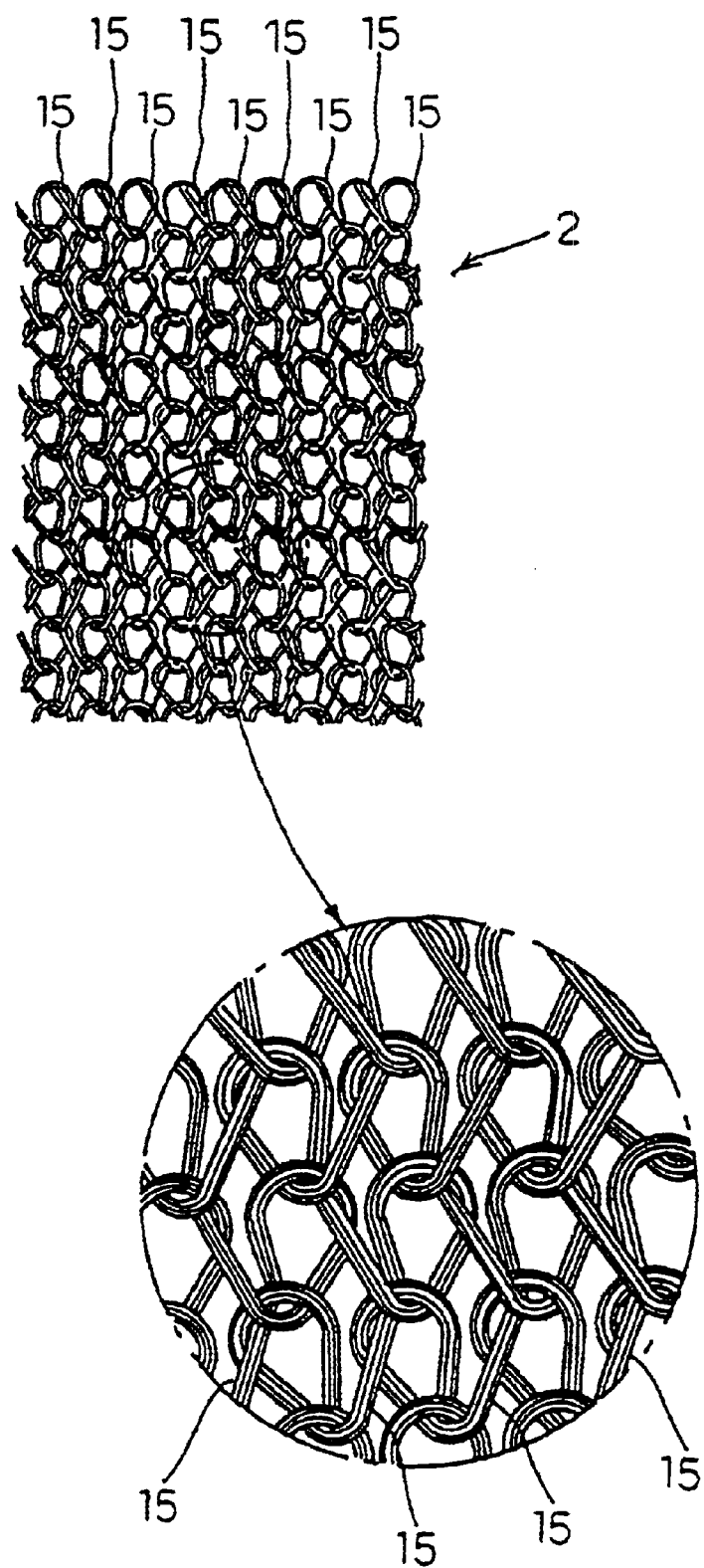
FIG. 6 is a plan view showing an application example of a packing material set forth in the first embodiment of the present invention.

Additionally, the packing material (2) set forth in the first embodiment is constructed by a weft knit processing of the weft material (3), however, it is not restricted to such. For example, as shown in FIG. 6, the packing material (2) can be constructed by a warp knit processing of plural pieces of warp material (15). In such case, the warp material (15) can take the same construction as the weft material (3).

A warp knit structure is comprised of a plurality of warp material (15) wherein a stitch constructed by the warp material (15) alternately intertwined with a stitch constructed by the warp material (15) which is adjacent thereto. Therefore, even when a part of the warp material (15) is cut off, the warp knit structure will not break. Also, the warp knit structure can be constructed more minute than the weft knit structure comprised of one piece of weft material (3), and has outstanding productivity, shape stability and elasticity.

The packing material (2) exemplified in FIG. 6 has been constructed because of such outstanding characteristics of the warp knit material. Thus, constructing the packing material (2) by a warp knit processing of the warp material (15) enables to obtain the packing material (2) with even better characteristics such as minuteness, productivity, shape stability and elasticity.

Though single tricot stitch as one example of the warp knit structure is applied to the packing material (2) shown in FIG. 6, the warp knit structure of the first embodiment is not restricted to this certain stitch. As for the warp knit structure other than the single tricot stitch, there are single atlas stitch, plain code stitch, double tricot stitch, lace stitch, Milanese stitch, raschel stitch and such which can be used for the warp knit processing of the packing material (2).

Figure 7:
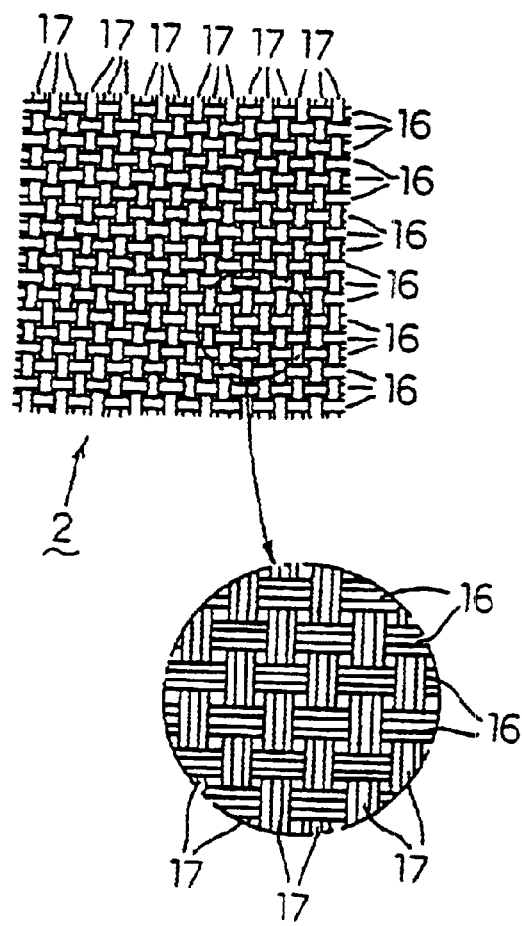
FIG. 7 is a plan view showing an application example of a packing material set forth in the first embodiment of the present invention.

Furthermore, the packing material (2) can take an another structure. For example, as shown in FIG. 7, the packing material (2) can be constructed by applying a weave processing to plurality of weft material (16) and of warp material (17). In such case, the weft material (16) and the warp material (17) can take the same structures as those of the weft material (3) and the warp material (15) mentioned in the above.

Generally speaking, a weave processing is known to have better pull strength and abrasion-resistance than a knit processing. The packing material (2) exemplified in FIG. 7 has been constructed because of such outstanding characteristics of the weave processing. Thus, constructing the packing material (2) by the weave processing of the weft material (16) and the warp material (17) enables to obtain the packing material (2) with even better pull strength and abrasion-resistance.

Though plain stitch as one example of the single layer weave structure is applied to the packing material (2) shown in FIG. 7, the weave structure of the first embodiment is not restricted to this certain stitch. As for the weave structure other than the plain stitch, there are single weave like twill weave, satin weave, combination weave, gauze & leno weave and jacquard weave which can be used for the weave processing of the packing material (2).

The second embodiment of the present invention will be explained hereinafter with a reference made to the drawings.

Figure 8:
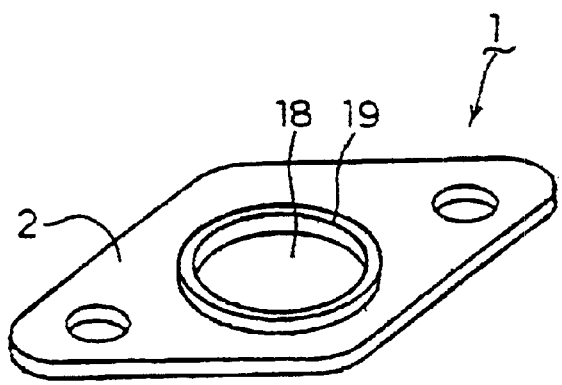
FIG. 8 is a perspective view showing a packing set forth in the second embodiment of the present invention.

FIG. 8 is a perspective view showing packing set forth in the second embodiment.

As for the packing (1) set forth in the second embodiment, the packing (1) set for in the first embodiment is used. However, the packing (1) of the second embodiment is constructed with the packing material (2) which is formed with a different method. That is, this packing (1) is constructed by a processing wherein the packing material (2) is cut into a desired shape having a centre bore (18) after pressure forming the packing material (2) into a platen shape. The centre bore (18) is a bore for the exhaust to pass through. Additionally, the packing (1) can be constructed by pressure forming either one sheet of the packing material (2) or one sheet of packing material (2) fold into many layers. Further, a plurality of packing material (2) which is layered can be pressure formed to construct a packing (1).

This packing (1) is a platen packing called gasket. This packing (1), for example, can be displaced in a connecting portion which is a constructing element of the exhaust system. In such case, the packing (1) is placed in-between two flanges (not shown in the drawings) set in the connecting portion by bolting with a locking bolt, so the packing (1) can prevent the exhaust to leak out from the flanges, and further, it can also efficiently absorb the vibration of the exhaust system. These effects are attributable to the outstanding characteristics of the above mentioned packing material (2).

Additionally, it is more preferred to have a ring shaped reinforcing material called grommet (19) embedded in the centre bore (18) for the exhaust to pass through. Both end surfaces of this grommet (19) are set to project out form both surfaces of the centre bore (18). By doing so, the exhaust hits a inner peripheral surface of the grommet (19), and thus, not only leaking out of the exhaust from two sheets of the flange can be prevented even more, but degrading of the packing (1) can also be prevented.

The third embodiment of the present invention will be explained hereinafter with a reference made to the drawings.

Figure 9:
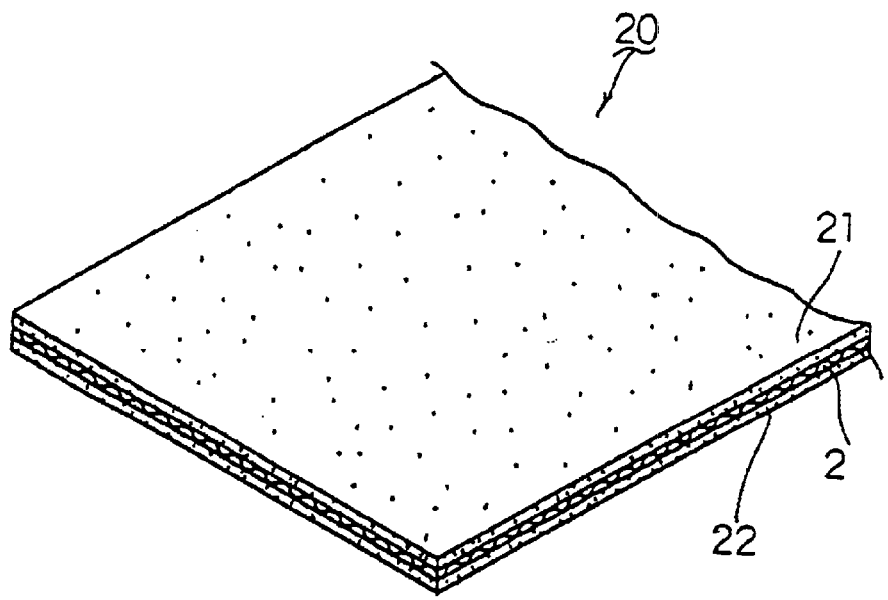
FIG. 9 is a plan view showing a part of a packing material set forth in the third embodiment of the present invention.
Figure 10:
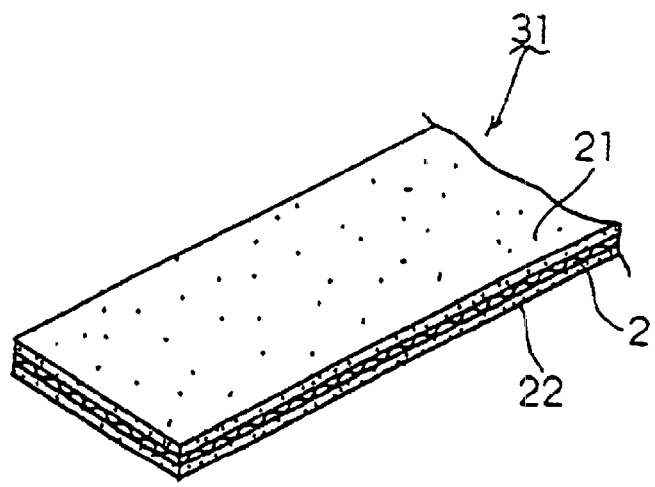
FIG. 10 is a plan view showing a part of a strip-shaped packing material of the third embodiment of the present invention.

FIG. 9 is a plan view showing a part of a packing material set forth in the third embodiment. FIG. 10 is a plan view showing a part of a strip-shaped packing material of the third embodiment.

Packing material (20) set forth in the third embodiment is constructed with the packing material (2) set forth in the first embodiment wherein one surface side thereof is unified with a metallic powder layer (21) comprising at least one kind selected from copper powder, copper alloy powder, aluminium powder, aluminium alloy powder, carbon steel powder, nickel powder and nickel alloy powder, and the other surface side thereof is unified with an expansive graphite layer (22). As a matter of convenience, the packing material (2) set forth in the first embodiment is to be called as net body (2).

Anything constructed by the above mentioned various kinds of knit processing and of weave processing can be used as the net body (2).

The metallic powder layer (21) is to make the surface of and the inner portion of the packing (1) minute and to prevent leaking out of fluid through the packing (1). This metallic powder layer (21) is constructed from pulverized powder of said metal. The particle diameter of the metal powder is not particularly restricted, but is preferably in the range of 10–50 $\mu$m. If the particle diameter is below $\mu$m, there will be an increase in cost, and the metal powder may fall off and may be difficult to handle. On the contrary, if the particle diameter is above $\mu$m, spaces between the metal pulverized powders get bigger, and thus, the sealing ability of the packing (1) may be lowered.

A method for forming the metallic powder layer (21) is not particularly restricted, and for example, the following method can be used. Firstly, after slightly applying adhesive on one surface of the net body (2), metallic powder is sprayed on the adhesive. By doing this, the metallic powder layer (21) can be formed. As for the adhesive used here, an adhesive which can be proof against a high temperature of more than 400° C. Examples of such adhesive are non-organic adhesives such as alumina, silica, boron, and pastes of boron or zirconia.

Other than this method, the metallic powder layer (21) can be formed by spraying a slurry or paste obtained by combining the metal powder, adhesive and solvent, on one surface of the net body (2).

Since the metallic powder layer (21) is such accumulating particulates of said metal in a high density, it is hard to permeate fluid through, and furthermore, due to the conformability to contacting opponent metal surface is high, the sealing ability of packing (1) can be improved. Also, if it is necessary, it is possible to weld and adhere the metallic powder layer (21) to the opponent metal surface.

Additionally, even under a high temperature, this metallic powder layer (21) does not sublimate and thus, it can continuously keep the high sealing ability of the packing (1) in spite of temperature change.

The expansive graphite layer (22) not only functions as a solid lubricating coat, but also is to make the surface of and the inner portion of the packing (1) minute and to prevent leaking out of fluid through the packing (1). This metallic powder layer (21) is constructed from pulverized powder of said metal.

The structure of the expansive graphite layer (22) is not particularly restricted, and as an example, a flexible expansive graphite sheet can be used for the construction thereof. As for this flexible expansive graphite sheet, after making a interlayer compound by reacting graphite powder such as natural graphite, heat decomposing graphite and kish graphite, with concentrated sulfuric acid, concentrated nitric acid and such, the residue of the compound is gained by a water bathing and is expanded by a quick heating, so that expansive flexible graphite can be gained and is pressure molded by a rolling material and such to be made in a sheet-shape for use.

The expansive graphite surpasses in self-lubricating ability, chemical resistance and conformability to contacting opponent surface. Therefore, the expansive graphite layer (22) can add such outstanding characteristics to the packing (1). Also, since the expansive graphite layer (22) is minutely accumulated with the expansive graphite, it is very hard for fluid to permeate through. Therefore, the expansive graphite layer (22) impedes the fluid to pass through an inner portion of the packing (1) and enhances the sealing ability of the packing (1).

By using the packing material (20) comprising such metallic powder layer (21) and the expansive graphite layer (22), the packing (1) which has better self-lubricating ability and sealing ability than those of the packing (1) only comprising the net body (2).

The packing (1) set forth in the third embodiment (cf., FIG. 11) is constructed as follows.

That is, firstly, a strip-shaped packing material (31) is formed by the packing material (20), and then, the packing (1) is constructed by a pressure forming of a wound body which is a strip-shaped packing material (31) being cylindrically wound, in a shaft direction. By doing so, one part of the metallic powder layer (21) and of the expansive graphite layer (22) is filled in mesh of the net body (2) which is also compressed, and thus, the mesh is blinded. Therefore, the packing (1) becomes to surpass in sealing ability with the surface and the inner portion thereof being minute.

Figure 11:
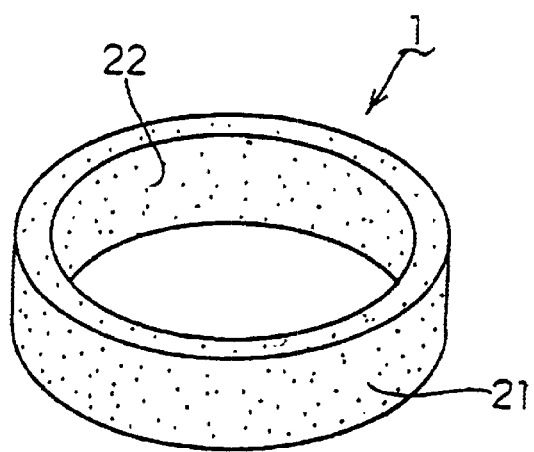
FIG. 11 is a perspective view showing a packing set forth in the third embodiment of the present invention.

Additionally, as for this packing (1), the packing comprised of the strip-shaped packing material (31) is wound in order for the metallic powder layer (21) to position on the outside and for the expansive graphite layer (22) to position on the inside, and the packing comprised of the strip-shaped packing material (31) is wound in order for the metallic powder layer (21) to position on the inside and for the expansive graphite layer (22) to position on the outside can be obtained, however, either packing can be used as the third embodiment. FIG. 11 is a perspective view showing an example of the packing (1) wherein the metallic powder layer (21) positions on the outside and the expansive graphite layer (22) positions inside.

The packing (1) illustrated is constructed in a cylindrical shape. On the inner peripheral surface of this packing (1), the expansive graphite layer (22) is exposed. Also, the outer peripheral surface of this packing (1), the metallic powder layer (21) is exposed.

Figure 12:
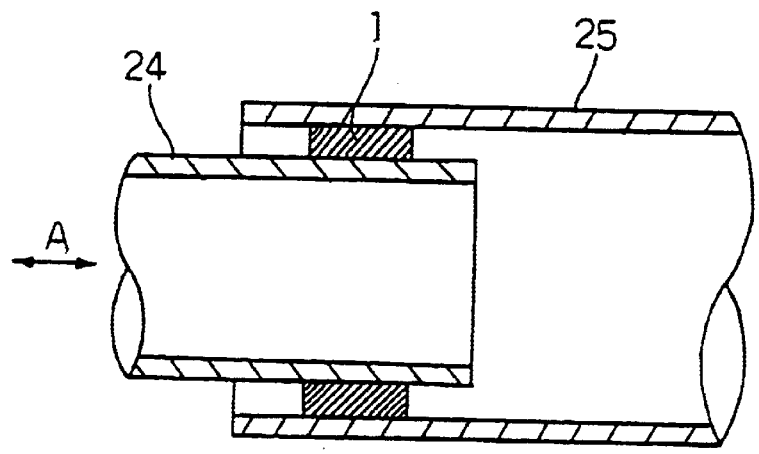
FIG. 12 is a sectional view showing a using condition of the packing shown in FIG. 11.

This packing (1), for example, is used as follows. FIG. 12 is a sectional view showing an example wherein the packing (1) is displaced on the connecting portion between the exhaust pipes. In this example, exhaust pipe (24) having a small bore and exhaust pipe (25) having a big bore are displaced so that one end portion of the exhaust pipe (24) having a small bore is inserted to one end portion of the exhaust pipe (25) having a big bore. At connecting structure of the exhaust pipes, the exhaust pipe (24) having a small bore can slightly move toward the exhaust pipe (25) having a big bore in the shaft direction (toward the direction of arrow A in the drawing).

At such connecting structure of the exhaust pipes, the packing (1) is fit on the outside of one end portion of the exhaust pipe (24) having a small bore and is fit in the inside of one end portion of the exhaust pipe (25) having a big bore. The metallic powder layer (21) positions on the outer peripheral surface and has good conformability to a metal surface, and thus, it can keep air tight between the packing (1) and the exhaust pipe (25) having a big bore.

Further, the packing (1) is fixed in the exhaust pipe (25) having a big bore. Since the metallic powder layer (21) positions on the outer peripheral surface of the packing (1), it is possible to adhere the packing (1) by welding said metallic powder layer (21) to the inner peripheral surface of the exhaust pipe (25) having a big bore. Additionally, a method for fixing the packing (1) to the exhaust pipe (25) having a big bore is not restricted to welding, and it may be carried out with adhesives, screw and such.

The inner peripheral surface of the packing (1) is pressure welded on the outer peripheral surface of the exhaust pipe (24) having a small bore. The expansive graphite layer (22) positioning on the inner peripheral surface of the packing (1) has good conformability to a metal surface, and thus, it can keep air tight between the packing (1) and the exhaust pipe (24) having a small bore. Also, the expansive graphite layer (22) surpasses in self-lubricating ability so that it can smoothly slide the exhaust pipe (24) having a small bore while keeping air tight between the packing (1) and the exhaust pipe (24) having a small bore.

In the inside of the packing (1), the expansive graphite layer (22) and the metal powder layer (21) are layer-like positioned. Since the expansive graphite layer (22) and the metal powder layer (21) are fulled minutely into the mesh of the net body, flowing of the exhaust air will be prevented as previously mentioned.

Also, when the expansive graphite is exposed in the air of a temperature which is more than 400° C., it is easily oxidized or sublimated as previously mentioned. However, the expansive graphite layer (22) exists as being rolled within the packing (1), and thus, only a portion thereof positioning on one end surface of the packing (1) contacts with the air of high temperature. In other words, the area of the expansive graphite layer (22) contacting the air of high temperature is small. Therefore, taking the maximum advantage of such characteristic of the expansive graphite layer (22), the packing (1) can suppress the effects of deterioration to the upmost, and thus, sealing between the exhaust pipes is made certain for a long period of time.

Further, the net body (2) surpasses in elasticity and the surface thereof surpasses in conformability, and thus, the packing (1) can be sealed by this net body (2) even when the expansive graphite layer (22) deteriorates after being used for a long period of time.

Figure 13:
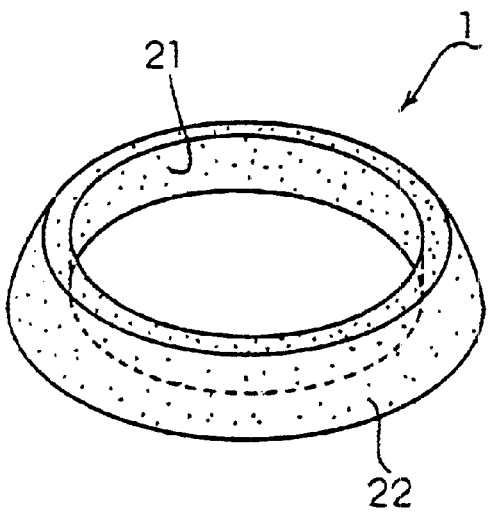
FIG. 13 is a perspective view showing an application example of packing set forth in the third embodiment of the present invention.

FIG. 13 is a perspective view showing an application example of the packing (1) wherein a strip-shaped packing material (31) with the metal powder layer (21) positioning inside and the expansive graphite layer (22) positioning outside, is rolled in a cylindrical shape.

The packing (1) shown in FIG. 13 has the same configuration of the packing (1) shown in FIG. 4. Also, the metal powder layer (21) positions on the inside surface and the expansive graphite layer (22) positions on the outside surface.

How to use such packing (1) is explained with a reference made to FIG. 5 which is a figure explaining the first embodiment. In the same way as the first embodiment, the packing (1) is fit on the cylinder portion (27) installed at the exhaust pipe (6) and is dispositioned in a condition of being hold between the spherical surfaced truncated cone portion (30) set on the catalytic converter (7) and the cylinder portion (27). Also, one end surface of the packing (1) is attached to the flange (9) set on the exhaust pipe (6). Further, by screwing the male screw portion of the bolt (14) to the female screw portion, the packing (1) becomes to be tightened onto the cylinder portion (27) and the spherical surfaced truncated cone portion (30).

Within such example, the metal powder layer (21) on the inner peripheral surface of the packing (1), and thus, the packing (1) well conforms to the outer peripheral surface of the cylinder portion (27). Therefore, the space between the packing (1) and the cylinder portion (27) is certainly sealed.

On the other hand, the expansive graphite layer (22) positions on the outer peripheral surface of the packing (1), and thus, not only the space between the packing (1) and the cylinder portion (27) is certainly sealed, but also the spherical surfaced truncated cone portion (30) can very smoothly slide.

As mentioned in the above, the expansive graphite is exposed in the air of a temperature which is more than 400° C., it is easily oxidized or sublimated. However, since the expansive graphite layer (22) exists as being rolled within the packing (1), only the portion positioning on one surface of the packing (1) contacts with the air of high temperature. Therefore, taking the maximum advantage of such characteristic of the expansive graphite layer (22), the packing (1) can suppress the effects of deterioration to the upmost. Thus, leaking out of the exhaust from the space between the exhaust pipe (6) and the catalytic converter (7) can be prevented for a long period of time.

Further, the net body (2) has good elasticity and the surface thereof has good conformability, and thus, the packing (1) can be sealed by this net body (2) even when the expansive graphite layer (22) deteriorates after being used for a long period of time.

Next, the forth embodiment of the present invention will be explained hereinafter with a reference made to the drawings.

Figure 15:
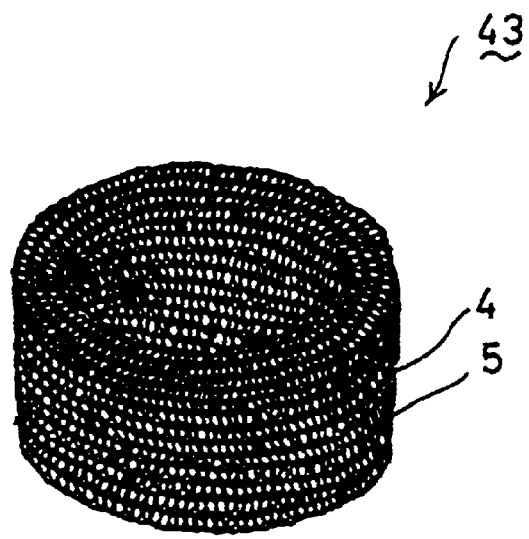
FIG. 15 is a perspective view showing packing material set forth in the forth embodiment of the present invention.
Figure 16:
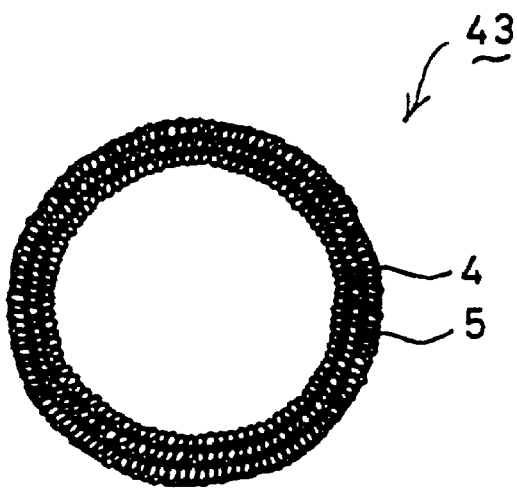
FIG. 16 is a plan view of the packing material shown in FIG. 15.

FIG. 15 is a perspective view showing a packing material set forth in the forth embodiment, and FIG. 16 is a plan view of the packing material shown in FIG. 15.

The packing material (43) set forth in the forth embodiment is formed by alternately twisting the hard metal wire (4) and the soft metal wire (5) after one or plurality pieces of the hard metal wire (4) and of the soft metal wire (5) are curled or formed into coil-shape.

As for the qualities of the hard metal wire (4) and the soft metal wire (5), these can be the same as those of the first embodiment. Further, the ratio of the numbers of the hard metal wire (4) and the soft metal wire (5) can also be the same as that of the first embodiment.

The reasons for making the hard metal wire (4) and the soft metal wire (5) curled or in coil-shape is that to twist these hard metal wire (4) and soft metal wire (5). The sectional shape of the hard metal wire (4) and the soft metal wire (5) is not particularly restricted, but as for examples thereof, it can be circular or square shapes.

A method for twisting the hard metal wire (4) and the soft metal wire (5) is also not particularly restricted, but as for an example, the same method as how to make a metal scrubbing-brush can be used. That is, as shown in FIG. 15, it can be constructed by intertwining curled or coil-shaped metal wires (4) and (5) and rolling into one layer or multiple layers. As a result, a rolled body which sectional surface vertical to the shaft direction is in a ring-shape. And, when setting the length thereof in the shaft direction relatively long, the sectional surface becomes doughnut-shape or cylindrical-shape (cf., FIG. 15), and when setting the length thereof in the shaft direction relatively short, the sectional surface becomes ring-shape (not shown in the drawings). Further, by setting the diameter of bore created in the centre of the rolled body small, almost columnar or disk shaped rolled body (not shown in the drawings) can be constructed.

A direction to which the metal wires (4) and (5) are rolled is not particularly restricted, however, as exemplified in FIGS. 15 and 16, they can be rolled in the peripheral direction of the packing material (43).

Figure 17:
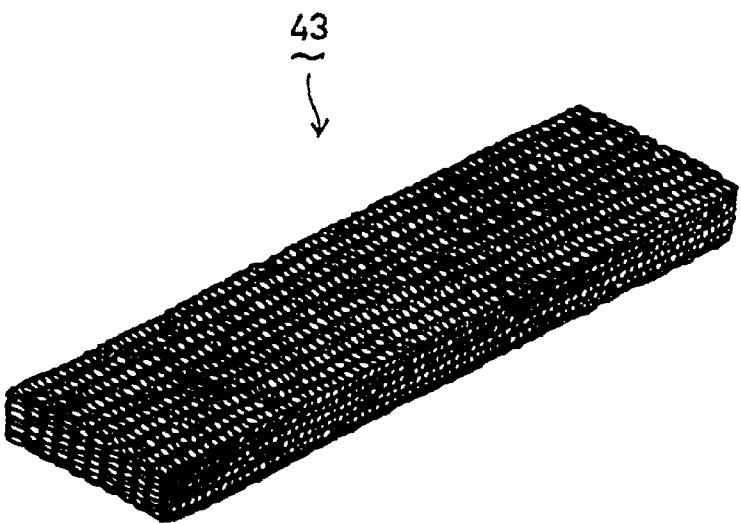
FIG. 17 is a perspective view showing a condition wherein the packing material of FIG. 15 is flattened in a radial direction thereof.

In a case of forming this packing material (43) in a cylindrical shape, by squashing this packing material (43) in radial direction thereof to flatten, a sheet-shaped packing material (43) can be formed, like shown in FIG. 17. In such case, in the same manner as to the first embodiment, it is possible to uniformly set a metal powder layer (not shown in the drawings) comprising at least either one kind selected from copper powder, copper alloy powder, aluminium powder, aluminium alloy powder, carbon steel powder, nickel powder or nickel alloy powder on one surface side of the sheet-shaped packing material (43), and to uniformly set an expansive graphite layer (not shown in the drawings) on the other surface side of the packing material (43).

Also, when forming the packing material (43) in a cylindrical shape as exemplified in FIG. 15, it is possible to insert therein a blinding material (not shown in the drawings) which is either strip-shape, flocculent-shape or nonwoven fabric-like shape and comprises at least either one kind selected from copper, copper alloy, aluminium, aluminium alloy, carbon steel, nickel or nickel alloy, in the same manner as to the first embodiment.

Furthermore, with the packing material (43) of the forth embodiment, it is possible to apply a nitriding to each of the metal wires (4) and (5) and to apply copper or nickel plating onto the surfaces of the metal wires (4) and (5) in the same manner as to the first embodiment.

Figure 18:
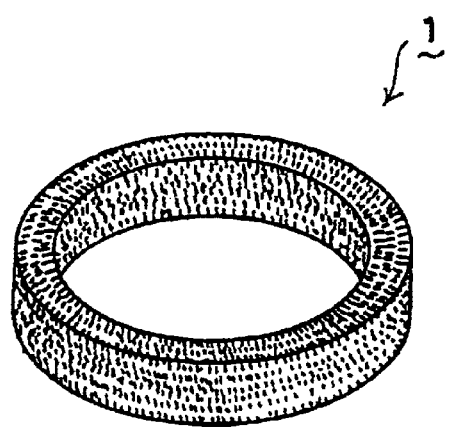
FIG. 18 is a perspective view showing packing set forth in the forth embodiment.

The packing (1) (cf., FIG. 18) of the forth embodiment is constructed from such packing material (43).

When forming the packing material (43) in a cylindrical shape, the packing can be constructed by pressure forming the packing material (43) in the shaft direction, in the same manner as to the first embodiment.

Also, when forming the packing material (43) in a sheet-shape (cf., FIG. 17), although it is not shown in the drawings, it is possible to construct the packing (1) by cutting the packing material (43) which has been pressure formed into a platen-shape, into a desired shape which has a centre bore, in the same manner as to the first embodiment. Further, when forming the packing material (43) in a sheet-shape, the packing can be constructed by pressure forming the packing material (43) in the shaft direction after the packing material (43) is cylindrically rolled.

Moreover, in a case wherein the packing material (43) is cylindrically formed and the above mentioned blinding material is inserted therein, the packing can be constructed by flattening the packing material (43) in the radial direction thereof and pressure forming a the rolled body which has been cylindrically rolled, in the same manner as to the first embodiment.

Additionally, after pressure forming a shape of packing, the packing (1) of the forth embodiment can be produced by applying copper or nickel plating on the surface thereof, in the same manner as to the first embodiment.

The present invention as set forth in claim 1 is a packing material wherein one or a plurality of hard metal wire and one or a plurality of soft metal wire are tied up or twisted in a bundle to construct a weft material wherein the ratio of the number of the former to the number of the later is 1:1–0.3, the weft material is put in weft knit processing such as plain stitch, rib stitch, pearl stitch, welt stitch, half cardigan, full cardigan, plating stitch and inter-lock stitch, and Brinell hardness of said hard metal wire is 90–240 (Kg/mm$^2$) and Brinell hardness of said soft metal is 40–55 (Kg/mm$^2$), wherein said hard metal wire is constructed from stainless carbide cast iron comprising iron (Fe) as a main component and each of the following as necessary components by weight %; C: 0.6–4.0%, V: 4–15%, Cr: 13–30%, Ni: 4–15%, Si: 0.2–4.5%, Mn: 0.2–1.5%, P: 0.01–0.15%, S: 0.01–0.05% and within such organization, mainly covalent bonded spheroidal or granular carbide of V-C system is crystallized, and the soft metal wire is constructed from either one of copper, copper alloy, aluminum or aluminum alloy, thus, it has the following effects.

That is, the present invention weft processes the weft material comprising the hard metal wire which surpusses in heat-resistance, mechanical strength, endurance limit and creep-resistance under a high temperature and the soft metal wire which surpasses in conformability and flexibility in appropriate ratio, and thus, the packing material is made eligible to supply such outstanding effects in well balanced manner, not only under a moderate temperature but also under a high temperature. Also, through a weft processing, the packing material will be made surpass in elasticity.

The present invention as set forth in claim 2 is a packing material wherein one or a plurality of hard metal wire and one or a plurality of soft metal wire are tied up or twisted in a bundle to construct a warp material wherein the ratio of the number of the former to the number of the later is 1:1–0.3, warp material is put in warp knit processing such as single tricot stitch, single atlas stitch, plain code stitch, double tricot stitch, lace stitch, Milanese stitch and raschel stitch, and Brinell hardness of said hard metal wire is 90–240 (Kg/mm$^2$) and Brinell hardness of said soft metal is 40–55 (Kg/mm$^2$), wherein said hard metal wire is constructed from stainless carbide cast iron comprising iron (Fe) as a main component and each of the following as necessary components by weight %; C: 0.6–4.0%, V: 4–15%, Cr: 13–30%, Ni: 4–15%, Si: 0.2–4.5%, Mn: 0.2–1.5%, P: 0.01–0.15%, S: 0.01–0.05% and within such organization, mainly covalent bonded spheroidal or granular carbide of V-C system is crystallized, and the soft metal wire is constructed from either one of copper, copper alloy, aluminum or aluminum alloy, thus, it has the following effects.

That is, the present invention weft processes the weft material comprising the hard metal wire which surpusses in heat-resistance, mechanical strength, endurance limit and creep-resistance under a high temperature and the soft metal wire which surpasses in conformability and flexibility in appropriate ratio, and thus, the packing material is made eligible to supply such outstanding effects in well balanced manner, not only under a moderate temperature but also under a high temperature. Also, through a warp processing, the packing material will be made surpass more not only in elasticity, but also in minuteness, productivity, shape-stability, flexibility and such.

The present invention as set forth in claim 3 is a packing material wherein one or a plurality of hard metal wire and one or a plurality of soft metal wire are tied up or twisted in a bundle to construct a weft material and a warp material wherein the ratio of the number of the former to the number of the later is 1:1–0.3, a plurality of each of the warp material and the warp material are prepared and put in knit processing such as single weave combination weave, gauze & leno weave, figured weave, and Brinell hardness of said hard metal wire is 90–240 (Kg/mm$^2$) and Brinell hardness of said soft metal is 40–55 (Kg/mm$^2$), wherein said hard metal wire is constructed from stainless carbide cast iron comprising iron (Fe) as a main component and each of the following as necessary components by weight %; C: 0.6–4.0%, V: 4–15%, Cr: 13–30%, Ni: 4–15%, Si: 0.2–4.5%, Mn: 0.2–1.5%, P: 0.01–0.15%, S: 0.01–0.05% and within such organization, mainly covalent bonded spheroidal or granular carbide of V-C system is crystallized, and the soft metal wire is constructed from either one of copper, copper alloy, aluminum or aluminum alloy, thus, it has the following effects.

That is, the present invention weave processes the weft and warp materials comprising the hard metal wire which surpusses in heat-resistance, mechanical strength, endurance limit and creep-resistance under a high temperature and the soft metal wire which surpasses in conformability and flexibility in appropriate ratio, and thus, the packing material is made eligible to supply such outstanding effects in well balanced manner, not only under a moderate temperature but also under a high temperature. Also, through a weave processing, the packing material will be made more surpass in pull strength, abrasion-resistance and such.

The present invention as set forth in claim 4 is a packing material wherein after one or a plurality of hard metal wire and one or a plurality of soft metal wire are curled or formed into a coil-shape, these hard metal wire and soft metal wire are twisted each other with the ratio of the number of the former to the number of the later being 1:1–0.3, Brinell hardness of said hard metal wire is 90–240 (Kg/mm$^2$), wherein said hard metal wire is constructed from stainless carbide cast iron comprising iron (Fe) as a main component and each of the following as necessary components by weight %; C: 0.6–4.0%, V: 4–15%, Cr: 13–30%, Ni: 4–15%, Si: 0.2–4.5%, Mn: 0.2–1.5%, P: 0.01–0.15%, S: 0.01–0.05% and within such organization, mainly covalent bonded spheroidal or granular carbide of V-C system is crystallized, and the soft metal wire is constructed from either one of copper, copper alloy, aluminum or aluminum alloy, and Brinell hardness of said soft metal is 40–55 (Kg/mm$^2$), thus, it has the following effects.

That is, the present invention intertwines the weft and warp materials comprising the hard metal wire which surpusses in heat-resistance, mechanical strength, endurance limit and creep-resistance under a high temperature and the soft metal wire which surpasses in conformability and flexibility in appropriate ratio, and thus, the packing material is made eligible to supply such outstanding effects in well balanced manner, not only under a moderate temperature but also under a high temperature. Also, since it is constructed with wire curled or shaped into a coil-shape, the packing material will be made surpass in elasticity.

The present invention as set forth in claims 5 to 7 is a packing material set forth in either one of the claims 1 to 3, wherein a metallic powder layer comprising at least one kind selected from copper powder, copper alloy powder, carbon steel powder, nickel powder and nickel alloy powder is uniformly set on one surface side thereof and an expansive graphite layer is uniformly set on the other surface side thereof, thus, it has the following effects.

That is, said metal powder layer is hardly permiates fluid, and also, it has good conformability to the opponent metal surface. Also, under a high temperature, it will not sublimate. On the other hand, the expansive graphite layer surpasses in self-lubricating ability, chemical resistance and conformability against the opponent metal surface. With the packing material comprising such metal powder layer and such expansive graphite layer, it is possible to construct a packing which has better sealing ability and lubricating ability than those of a packing made only form the hard and soft metal wire, under a high temperature. Also, in a case of a packing comprising this packing material which is rolled, the expansive graphite layer positions on either side of inner or out peripheral surface of the packing, and the copper powder layer positions on the other side thereof, and also, the expansive graphite layer and the copper powder layer exist at the inside portion, in a condition wherein they are rolled. Therefore, this pacing is displaced in between the portions to be sealed, and it certainly seals the space between these portions and at the same time, it slides one portion of the two very smoothly. Also, due to the outstanding elasticity and conformability of the net body comprising hard and soft metal wire, better sealing can be done. Also, with this packing, deterioration ounder a high temperature can be prevented.

The present invention as set forth in claim 8 also has the same effects as those of claims 5 to 7.

The present invention as set forth in claims 9 to 11 is a packing material in a cylindrical body comprised of the packing material set forth in either one of the claims 1 to 3, wherein a blinding material which is either strip-shape, flocculent shape or nonwoven fabric-like shape and is comprised of at least one kind selected from copper, copper alloy, carbon steel, nickel and nickel alloy, is inserted, thus, it has the following effects.

That is, the blindling material is filled in the cylindrical packing material, and thus, in a case of a packing is constructed by a compress forming of this packing material, the blinding material will be filled in the mesh of the packing material. Therefore, the sealing ability of the packing can be improved.

The present invention as set forth in claim 12 also has the same effects as those of claims 9 to 11.

The present invention as set forth in claims 13 to 16 is a packing material wherein the packing material set forth in either one of the claims 1 to 4 is applied with a nitriding, thus, it has the following effects.

That is, it is possible to harden the packing material, persistency of the packing can be improved even more.

The present invention set forth in claims 17 to 20 is a packing material wherein the surfaces of said hard metal wire and said soft metal wire of the packing material set forth in either one of the claims 1 to 4 are applied with either copper or nickel plating, thus, it has the following effects.

That is, the conformability and corrosion-resistance of the packing material can be improved, and thus, when the packing material is made into a packing, it is possible to improve the the conformability and corrosion-resistance thereof.

The present invention set forth in claims 21 to 23 is a packing material wherein the packing material set forth in the claim 4 is formed into a strip-shape wherein a rolled body which is cylindrically rolled with this strip-shaped packing material is pressure formed in a shaft direction, thus, it has the following effects.

That is, this packing has a good conformability against the contacting opponent surface, and also, the front surface structure and inner portion structure thereof are minute, and further, applied relaxation will not occur even when used under a high temperature for a long period of time, therefore, outstanding sealing can be carried out for a long period of time.

The present invention as set forth in claim 24 also has the same effects as those of claims 21 to 23.

The present invention as set forth in claim 25 is a packing wherein the packing material set forth in either one of the claims 1 to 4 is pressure formed into a platen shape and then is cut into a desired shape having a centre bore, thus, it has the following effects.

That is, the front surface structure and inner portion structure of this packing are minute, and further, applied relaxation will not occur even when used under a high temperature for a long period of time, therefore, outstanding sealing can be carried out for a long period of time.

The present invention as set forth in claims 29 to 32 is a packing wherein the packing material set forth in either one of the claims 9 to 12 is flattened in a radial direction and a rolled body which is cylindrically rolled with said packing material is pressure formed in a shaft direction thereof, thus, this invention also has the same effects as those of claims 21 to 23.

The present invention set forth in claims 33 to 44 is a packing wherein the surfaces of the packing set forth in either one of the claims 21 to 32 are applied with either copper or nickel plating, thus, it can improve the conformability and the corrosion-resistance.

What is claimed is:

1. A packing material comprising one or a plurality of hard metal wire and one or a plurality of soft metal wire are tied up or twisted in a bundle to construct a weft material wherein the ratio of the number of the former to the number of the later is 1:1–0.3, the weft material is put in weft knit processing such as plain stitch, rib stitch, pearl stitch, welt stitch, half cardigan, full cardigan, plating stitch and interlock stitch, and Brinell hardness of said hard metal wire is 90–240 (Kg/mm$^2$) and Brinell hardness of said soft metal is 40–55 (Kg/mm$^2$), heat resistance, mechanical strength, endurance limit, and flexibility can be improved by disposing hard metal wires, and conformability and flexibility can be improved by disposing soft metal wires.

2. A packing material comprising one or a plurality of hard metal wire and one or a plurality of soft metal wire are tied up or twisted in a bundle to construct a warp material wherein the ratio of the number of the former to the number of the later is 1:1–0.3, warp material is put in warp knit processing such as single tricot stitch, single atlas stitch, plain code stitch, double tricot stitch, lace stitch, Milanese stitch and raschel stitch, and Brinell hardness of said hard metal wire is 90–240 (Kg/mm$^2$) and Brinell hardness of said soft metal wire is 40–55 (Kg/mm$^2$), heat resistance, mechanical strength, endurance limit, and flexibility can be improved by disposing hard metal wires, and conformability and flexibility can be improved by disposing soft metal wires.

3. A packing material comprising one or a plurality of hard metal wire and one or a plurality of soft metal wire are tied up or twisted in a bundle to construct a weft material and a warp material wherein the ratio of the number of the former to the number of the later is 1:1–0.3, a plurality of each of the warp material and the weft material are prepared and put in knit processing such as single weave, combination weave, gauze & leno weave and jacquard weave, and Brinell hardness of said hard metal wire is 90–240 (Kg/mm$^2$) and Brinell hardness of said soft metal wire is 40–55 (Kg/mm$^2$), heat resistance, mechanical strength, endurance limit, and flexibility can be improved by disposing hard metal wires, and conformability and flexibility can be improved by disposing soft metal wires.

4. A packing material comprising after one or a plurality of hard metal wire and one or a plurality of soft metal wire are curled or formed into a coil-shape, these hard metal wire and soft metal wire are twisted each other with the ratio of the number of the former to the number of the later being 1:1–0.3, and Brinell hardness of said hard metal wire is 90–240 (Kg/mm$^2$) and Brinell hardness of said soft metal wire is 40–55 (Kg/mm$^2$), heat resistance, mechanical strength, endurance limit, and flexibility can be improved by disposing hard metal wires, and conformability and flexibility can be improved by disposing soft metal wires.

5. A packing material set forth in claim 1, wherein a metallic powder layer comprising at least one kind selected from copper powder, copper alloy powder, carbon steel powder, nickel powder and nickel alloy powder is unified with one surface side thereof and a expanded graphite layer is unified with on the other surface side thereof.

6. A packing material set forth in claim 2, wherein a metallic powder layer comprising at least one kind selected from copper powder, copper alloy powder, carbon steel powder, nickel powder and nickel alloy powder is unified with one surface side thereof and a expanded graphite layer is unified with the other surface side thereof.

7. A packing material set forth in claim 3, wherein a metallic powder layer comprising at least one kind selected from copper powder, copper alloy powder, carbon steel powder, nickel powder and nickel alloy powder is unified with one surface side thereof and a expanded graphite layer is unified with the other surface side thereof.

8. A packing material wherein the packing material set forth in the claim 4 is formed into a sheet-shape of which one surface side is uniformly set with at least one kind selected from copper, copper alloy, carbon steel, nickel and nickel alloy, and of which other surface side is uniformly set with a expanded graphite layer.

9. A packing material in a cylindrical body comprised of the packing material set forth in claim 1, wherein a blinding material which is either strip-shape, flocculent shape or nonwoven fabric-like shape and is comprised of at least one kind selected from copper, copper alloy, carbon steel, nickel and nickel alloy, is inserted.

10. A packing material in a cylindrical body comprised of the packing material set forth in claim 2, wherein a blinding material which is either strip-shape, flocculent shape or nonwoven fabric-like shape and is comprised of at least one kind selected from copper, copper alloy, carbon steel, nickel and nickel alloy, is inserted.

11. A packing material in a cylindrical body comprised of the packing material set forth in claim 3, wherein a blinding material which is either strip-shape, flocculent shape or nonwoven fabric-like shape and is comprised of at least one kind selected from copper, copper alloy, carbon steel, nickel and nickel alloy, is inserted.

12. A packing material wherein the packing material set forth in the claim 4 is formed into a cylindrical shape wherein a blinding material which is either strip-shape, flocculent shape or nonwoven fabric-like shape and is comprised of at least one kind selected from copper, copper alloy, carbon steel, nickel and nickel alloy, is inserted.

13. A packing material wherein the packing material set forth in claim 1 is applied with a nitriding.

14. A packing material wherein the packing material set forth in claim 2 is applied with a nitriding.

15. A packing material wherein the packing material set forth in claim 3 is applied with a nitriding.

16. A packing material wherein the packing material set forth in claim 4 is applied with a nitriding.

17. A packing material wherein the surfaces of said hard metal wire and said soft metal wire of the packing material set forth in claim 1 is applied with either copper or nickel plating.

18. A packing material wherein the surfaces of said hard metal wire and said soft metal wire of the packing material set forth in claim 2 is applied with either copper or nickel plating.

19. A packing material wherein the surfaces of said hard metal wire and said soft metal wire of the packing material set forth in claim 3 is applied with either copper or nickel plating.

20. A packing material wherein the surfaces of said hard metal wire and said soft metal wire of the packing material set forth in claim 4 is applied with either copper or nickel plating.

21. A packing material wherein the packing material set forth in the claim 1 is formed into a strip-shape wherein a rolled body which is cylindrically rolled with this strip-shaped packing material is pressure formed in the shaft direction.

22. A packing material wherein the packing material set forth in the claim 2 is formed into a strip-shape wherein a rolled body which is cylindrically rolled with this strip-shaped packing material is pressure formed in the shaft direction.

23. A packing material wherein the packing material set forth in the claim 3 is formed into a strip-shape wherein a rolled body which is cylindrically rolled with this strip-shaped packing material is pressure formed in the shaft direction.

24. A packing material wherein the packing material set forth in the claim 4 is formed into a cylindrical shape and then this cylindrical shaped packing material is pressure formed in the shaft direction thereof.

25. A packing wherein the packing material set forth in claim 1 is pressure formed into a plate-shape and then is cut into a desired shape having a center bore.

26. A packing wherein the packing material set forth in claim 2 is pressure formed into a plate-shape and then is cut into a desired shape having a center bore.

27. A packing wherein the packing material set forth in claim 3 is pressure formed into a plate-shape and then is cut into a desired shape having a center bore.

28. A packing wherein the packing material set forth in claim 4 is pressure formed into a plate-shape and then is cut into a desired shape having a center bore.

29. A packing wherein the packing material set forth in claim 9 is flattened in a radial direction and a rolled body which is cylindrically rolled with said packing material is pressure formed in the shaft direction thereof.

30. A packing wherein the packing material set forth in claim 10 is flattened in a radial direction and a rolled body which is cylindrically rolled with said packing material is pressure formed in the shaft direction thereof.

31. A packing wherein the packing material set forth in claim 11 is flattened in a radial direction and a rolled body which is cylindrically rolled with said packing material is pressure formed in the shaft direction thereof.

32. A packing wherein the packing material set forth in claim 12 is flattened in a radial direction and a rolled body which is cylindrically rolled with said packing material is pressure formed in the shaft direction thereof.

33. A packing wherein the surfaces of the packing set forth in claim 21 is applied with either copper or nickel plating.

34. A packing wherein the surfaces of the packing set forth in claims 22 is applied with either copper or nickel plating.

35. A packing wherein the surfaces of the packing set forth in claim 23 is applied with either copper or nickel plating.

36. A packing wherein the surfaces of the packing set forth in claim 24 is applied with either copper or nickel plating.

37. A packing wherein the surfaces of the packing set forth in claim 25 is applied with either copper or nickel plating.

38. A packing wherein the surfaces of the packing set forth in claim 26 is applied with either copper or nickel plating.

39. A packing wherein the surfaces of the packing set forth in claim 27 is applied with either copper or nickel plating.

40. A packing wherein the surfaces of the packing set forth in claim 28 is applied with either copper or nickel plating.

41. A packing wherein the surfaces of the packing set forth in claim 29 is applied with either copper or nickel plating.

42. A packing wherein the surfaces of the packing set forth in claim 30 is applied with either copper or nickel plating.

43. A packing wherein the surfaces of the packing set forth in claim 31 is applied with either copper or nickel plating.

44. A packing wherein the surfaces of the packing set forth in claim 32 is applied with either copper or nickel plating.

* * * * *